(No Model.)

C. A. SIGELEN.
PNEUMATIC INKSTAND.

No. 531,474. Patented Dec. 25, 1894.

Witnesses
G. C. Conner
Leila Monroe

Inventor
Christian A. Sigelen
By Attorney
V. H. Lockwood

UNITED STATES PATENT OFFICE.

CHRISTIAN A. SIGELEN, INDIANAPOLIS, INDIANA.

PNEUMATIC INKSTAND.

SPECIFICATION forming part of Letters Patent No. 531,474, dated December 25, 1894.

Application filed March 29, 1894. Serial No. 505,657. (No model.)

*To all whom it may concern:*

Be it known that I, CHRISTIAN A. SIGELEN, of Indianapolis, county of Marion, and State of Indiana, have invented certain new and useful Improvements in Pneumatic Inkstands; and I do hereby declare that the following is a full, clear, and exact description thereof, reference being had to the accompanying drawings, in which like figures refer to like parts.

My invention relates to improvements in pneumatic ink stands, that is, those in which the ink is contained in a well and caused to rise in a funnel by pneumatic pressure caused by the depression of a diaphragm.

One feature of my invention consists in providing a diaphragm with a hole or air-vent in it so combined with a shoulder of the funnel that the hole will be closed while the diaphragm is in its normal position or when the funnel is depressed, but the diaphragm is sufficiently thin that the vent will be open when the diaphragm is uplifted somewhat, whether such result be caused by expansion of the air in the well or by filling the well with ink through the funnel. Heretofore, ink stands of this character have been so constructed that a change of temperature over night would cause the ink to overflow, and the ink stand could not be filled without removing the entire top. This difficulty has been sought to be overcome by making the funnel fit very loosely in the aperture in the diaphragm so an air passage would be left, but this was very imperfect in practice as it would often permit the air to escape when the funnel was pushed down and allowed a vertical play between the funnel and diaphragm which destroyed the sensitiveness of the device. I also make the shoulder of my funnel slightly oval in order that all of it may not rest on the diaphragm. By this construction, I make the device much more sensitive. I also provide an aperture in the cap to permit the escape of any air from beneath the cap.

The features of my invention will appear more fully from the description following and the accompanying drawings.

Figure 1:
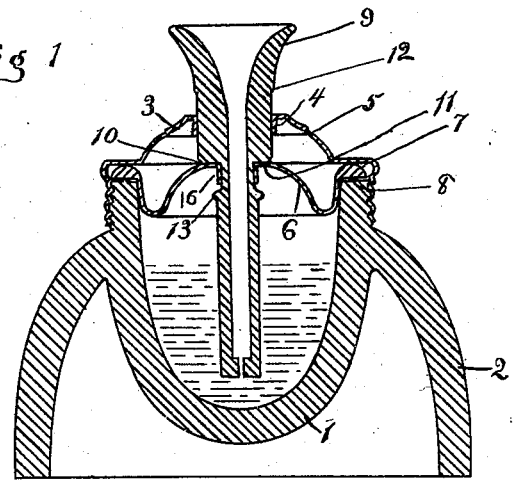
Figure 3:
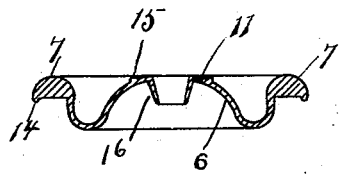
Figure 2:
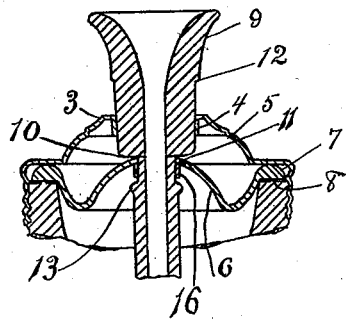

Figure 1 is a vertical central section of my ink stand. Fig. 2 is a section of the upper part showing the diaphragm centrally uplifted as when the ink well is being filled through the funnel. Fig. 3 is a central vertical section of modified forms of the diaphragm.

In detail, 1 is my ink well suspended within the shell 2 as shown in Fig. 1. This is made of glass by a very cheap and economical method. The thickness of the well and shell is the same at all points so that there can be no unequal contraction or expansion of the parts arising from a change in the temperature. The well is tapered but somewhat conical as shown so that the ink stand will operate when the ink is low. The shell 2 forms a broad support for the ink well whereby it is not easily overturned.

The upper end of the well is provided with threads on which is screwed the cap 3 provided with a downwardly turned flange 4 at the top which is preferably integral with the cap 3. A hole 5 is provided to permit the escape of any surplus air beneath the cap. Between the cap and the ink well, I mount the diaphragm 6. It is made of rubber in the form shown with double reverse curves and with the seat 7 having a flat surface and resting upon the top of the ink well, the latter being provided with a bead at 8. The cap is clamped down tightly to the ink well, thus causing the seat 7 of the diaphragm to act as a gasket in sealing the ink well, rendering it air tight. The cap however can be removed, and the device still be serviceable inasmuch as the diaphragm itself effectually seals the ink well.

Through a central aperture in the diaphragm extends the funnel 9 provided with a shoulder 10 resting on the diaphragm. This shoulder is preferably oval so that only a portion of it will rest on the diaphragm when the latter is in its normal position. This renders the diaphragm more sensitive when the pen pushes the funnel down.

16 is a depending collar or sleeve of the diaphragm which tightly embraces the funnel tube rendering any escape of air therefrom impossible and causing the movement of the funnel and diaphragm always to be synchronous.

I provide a hole 11 in the diaphragm that is placed beneath the shoulder 10 in such a position that when the diaphragm is in its normal position or when the funnel is pushed down, the shoulder will close the hole 11, but when the diaphragm is pushed up, whether by expansion of air below or by filling through the funnel, the shoulder 10 will not close the opening 11, thus permitting the surplus air to escape through such opening and avoid forcing the ink out through the funnel and overflowing. The object of the reverse curves is to distribute the flexion throughout the diaphragm instead of confining it to one line. This feature as well as the action of the valve or opening 11 is shown in Fig. 2 where the diaphragm is pushed up somewhat. There it is seen that the opening 11 is free to permit the escape of air and the diaphragm bends slightly at all points instead of at one.

In the successful use and operation of this class of ink stand, the two features just described are very important.

I provide a small shoulder 12 on the funnel to prevent its being pressed down too far and also a shoulder 13 below the diaphragm to prevent the funnel from being withdrawn when a person attempts to lift the whole device by catching the top of the funnel. Figs. 3 and 4 are modified forms of the diaphragm. In Fig. 3 is shown a lip 14 used to more quickly seal the ink well, and also an annular ridge or bead 15 on which the shoulder 10 of the funnel rests. Fig. 4 shows a single curve instead of the reverse curve, combined with a straight top so arranged that the flexion will be distributed throughout the diaphragm.

It will be seen by the preceding description and drawings that I have an ink stand which overcomes several objections to prior devices of this nature and which overcomes all of the objections that I have been able to discover, thus making an ink stand all of whose parts will last a long time. The ink well will not crack or break. The ink will not flow out at the top of the funnel by the expansion of the air below the diaphragm. The well can be filled by pouring ink into the funnel without removing the cap which often becomes so secure that it can hardly be removed. The diaphragm will not wear and break at one place and will bend at all points equally; and the combination of the diaphragm with the shoulder of the funnel will render the device sensitive to any pressure of the funnel.

What I claim as my invention, and desire to secure by Letters Patent, is—

1. In a pneumatic ink stand, a diaphragm having a central conoidal portion provided with an air vent in its top, and a funnel extending through such diaphragm provided with a shoulder overhanging such air-vent and adapted to close the same, said diaphragm being sufficiently thin to centrally rise to a point when there is air pressure below whereby the vent is opened, substantially as herein described.

2. In a pneumatic ink stand, a funnel provided with a shoulder, and a diaphragm having a central conoidal portion with a central opening through which such funnel extends, a collar depending from such diaphragm tightly embracing such funnel and an air vent in the top of the diaphragm under the shoulder of the funnel, substantially as shown and described.

3. In a pneumatic ink stand, a diaphragm having a central conoidal portion provided with an air vent in its top, said diaphragm being sufficiently thin to rise centrally to a point when there is air pressure below and a funnel extending centrally through such diaphragm and provided with a shoulder over such air vent and rounded whereby only a portion of such shoulder will rest on the diaphragm when the funnel is not depressed.

4. A pneumatic ink stand consisting of an ink well, a diaphragm provided with an annular seat resting on such ink well and having reverse curves forming a central conoidal and outer depressed portion and having an air vent in its top, and a centrally depending collar, a cap adapted to clamp the diaphragm to the ink well and having an air vent in its top and a funnel extending through the cap and said collar on the diaphragm and provided with a shoulder adapted to rest on such diaphragm and over-hanging said air-vent whereby it will close or open the air vent in such diaphragm, substantially as shown and described.

In witness whereof I hereunto set my hand this 20th day of March, 1894.

CHRISTIAN A. SIGELEN.

Witnesses:
V. H. LOCKWOOD,
LELA MONROE.